United States Patent

Anderson

[11] Patent Number: 5,863,272
[45] Date of Patent: Jan. 26, 1999

[54] RAISE DRILL ASSEMBLY WITH TWO-PIECE PLANETARY THIRD REDUCTION HUB AND OUT PUT SHAFT

[75] Inventor: Llewellan Anderson, Renton, Wash.

[73] Assignee: Atlas Copco Robbins Inc., Kent, Wash.

[21] Appl. No.: 810,419

[22] Filed: Mar. 4, 1997

[51] Int. Cl.[6] .................................................. F16H 57/08
[52] U.S. Cl. ........................................ 475/331; 475/337
[58] Field of Search ..................................... 475/331, 337

[56] References Cited

U.S. PATENT DOCUMENTS

| | | | |
|---|---|---|---|
| 986,588 | 3/1911 | O'Kelly | 475/331 |
| 1,386,446 | 8/1921 | Talley | 475/331 |
| 3,220,494 | 11/1965 | Cannon et al. | 175/25 |
| 3,454,114 | 7/1969 | Poage | 173/152 |
| 3,490,546 | 1/1970 | Hattrup et al. | 173/23 |
| 3,741,381 | 6/1973 | Klein et al. | 173/152 |
| 4,468,985 | 9/1984 | Nilsson | 475/337 |
| 4,721,014 | 1/1988 | Ohkubo | 475/331 |
| 5,370,194 | 12/1994 | Anderson et al. | 173/216 |
| 5,649,879 | 7/1997 | Kusumoto et al. | 475/331 |

OTHER PUBLICATIONS

Three photographs showing disassembled two–piece output shaft, interconnectable by six long bolts, which is made and sold by Strata Boring Services Division of RVC Mining Co., Alberton, South Africa, Dec., 1995.
B–LOC Corp of Monroe, NY, Information Sheet (one page) from Catalog, Dec., 1995, entitled Other B–LOC Shaft/Hub Connectors and including a drawing of Internal Shrink Discs.

Primary Examiner—Charles A. Marmor
Assistant Examiner—Sherry Lynn Estremsky
Attorney, Agent, or Firm—Graybeal Jackson Haley LLP

[57] ABSTRACT

A two-piece planetary hub and output shaft for use in a planetary reduction gear drive assembly for a raise drill having a drive motor and a drive train path including first, second and third reduction gearing driving the planetary hub and output shaft. The hub and shaft are formed as two major pieces, an upper hub and a lower output shaft which are rigidly interconnected by three planet gear shafts each engaging a hole in said hub and a recess in said lower output shaft. Such interconnection is suitably by taper lock bushing assemblies locking the shafts to both said hub and said shaft. Transfer of torque occurs essentially through the planet shafts and the hub, and transfer of load occurs essentially through the output shaft.

12 Claims, 4 Drawing Sheets

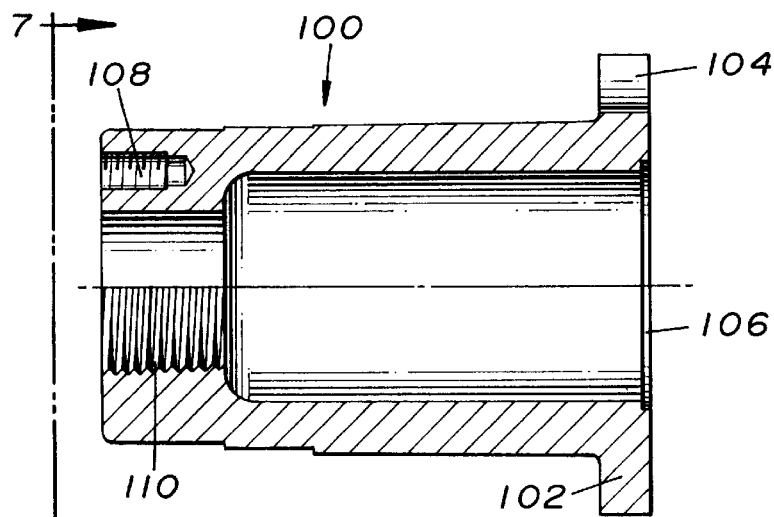
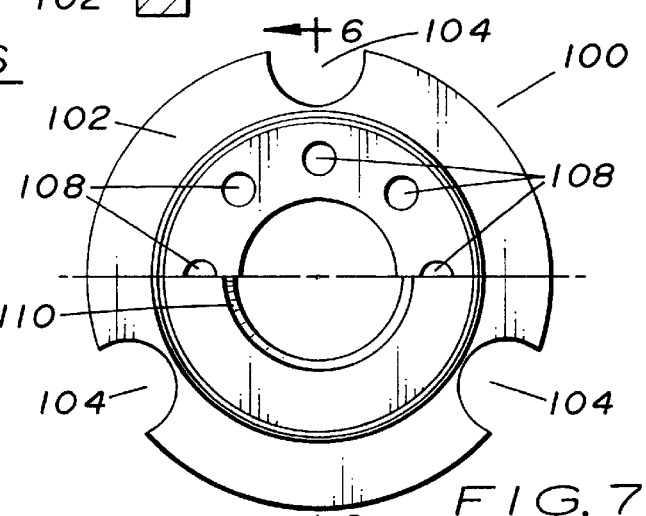
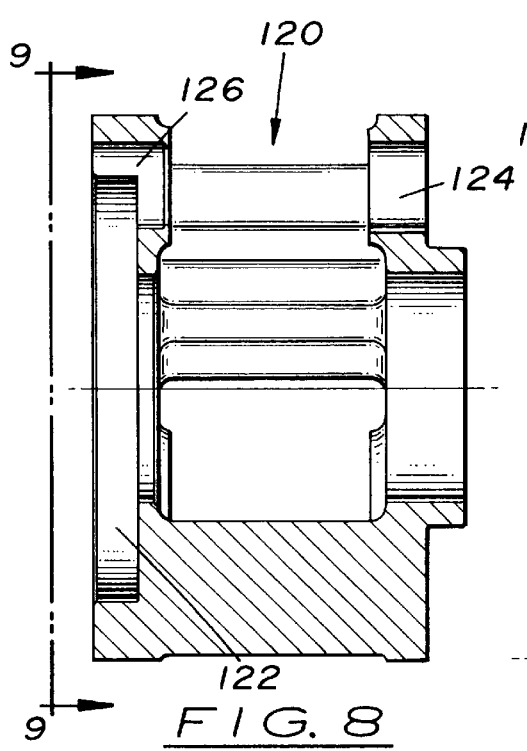
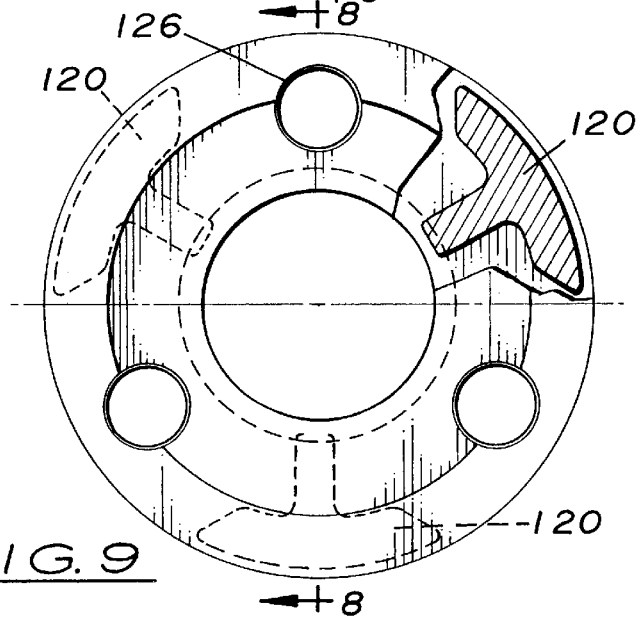

RAISE DRILL ASSEMBLY WITH TWO-PIECE PLANETARY THIRD REDUCTION HUB AND OUT PUT SHAFT

FIELD OF THE INVENTION

The invention relates to earth drilling machines known as raise drills. More specifically, the invention pertains to a raise drill drive assembly and more particularly to a two-piece third reduction hub and output shaft for such an assembly.

DESCRIPTION OF THE PRIOR ART

Earth drilling machines known as raise drills are well known and representative patents disclosing such are Cannon et al. U.S. Pat. No. 3,220,494, Poage U.S. Pat. No. 3,454,114, Hattrup et al. U.S. Pat. No. 3,490,546, Klein et al. U.S. Pat. No. 3,741,318, and Anderson U.S. Pat. No. 5,370,194. To be noted in particular for aid in understanding the present invention is the commonly used drill string drive assembly used in these earlier raise drills which has a three-stage planetary gear reduction drive train such as shown at FIG. 7 in U.S. Pat. No. 3,454,114 and at FIG. 10 in U.S. Pat. No. 3,490,546. This assembly includes what is called in these patents a large main or output shaft 152 which is the final driven element of the planetary gear drive train. A similar output shaft is disclosed in U.S. Pat. No. 3,741,318, FIG. 4, at main shaft 108. It is to an improvement of this type of main or output shaft that the present invention is directed. Such an output shaft, which is also commonly called a hub and output shaft in the past characteristically has been machined in one piece which is a complicated and expensive fabrication and, since the lower part of the hub and output shaft is commonly the part of the planet gear drive train subjected to most wear during extended use, replacement in its entirety is unduly complicated and expensive. In most instances, failure occurs by reason of undue wear or thread loss at the lower end of the output shaft but with the third reduction gear hub and the lower end of the output shaft all one piece, the hub part has to be replaced as well.

SUMMARY OF THE INVENTION

It is an object and feature of the present invention to provide in a raise drill planetary reduction gear drive assembly a planetary hub and output shaft formed as two major pieces, an upper hub and a lower output shaft with the two pieces interconnected by three planet gear shafts each of which has a taper lock bushing assembly serving to interconnect the hub and shaft.

Another significant object and feature of the two-piece hub and output shaft of the present invention is that the strength of the output shaft can be significantly improved by virtue of the fact that it can be made from a stronger piece of steel and can be more readily heat hardened than can the overly large one-piece unit. The hub portion similarly does not require the high strength of the output shaft and can be made from a steel of lesser strength.

It is also an object and feature of the present invention to simplify and make more economical a two-piece raise drill planetary hub and output shaft which can be used both for component replacement in existing equipment or as a component in original equipment manufacture.

These and other objects, features and advantages of the invention will be apparent from the following more detailed description of a prior art embodiment of a three-stage planetary gear drive train and a raise drill drive assembly having a one-piece hub and output shaft, followed by a description of a two-piece hub and output shaft embodying the invention.

BRIEF DESCRIPTION OF THE DRAWINGS

In the drawings, like numerals refer to like parts and:

FIG. 6 is an axial cross-sectional view of the output shaft of a two-piece hub and output shaft made according to the present intention, taken substantially along line 6—6 of FIG. 7.

FIG. 7 is an end elevational view of the output shaft shown in FIG. 6, taken substantially along line 7—7 thereof.

FIG. 8 is an axial cross-sectional view of a hub portion of a hub and output shaft made according to the present invention, taken substantially along line 8—8 of FIG. 9.

FIG. 9 is a view, partially in cross-section and partially in elevation, of the hub shown in FIG. 8, taken substantially along line 9—9 thereof.

DESCRIPTION OF THE PREFERRED EMBODIMENT

Figure 1:
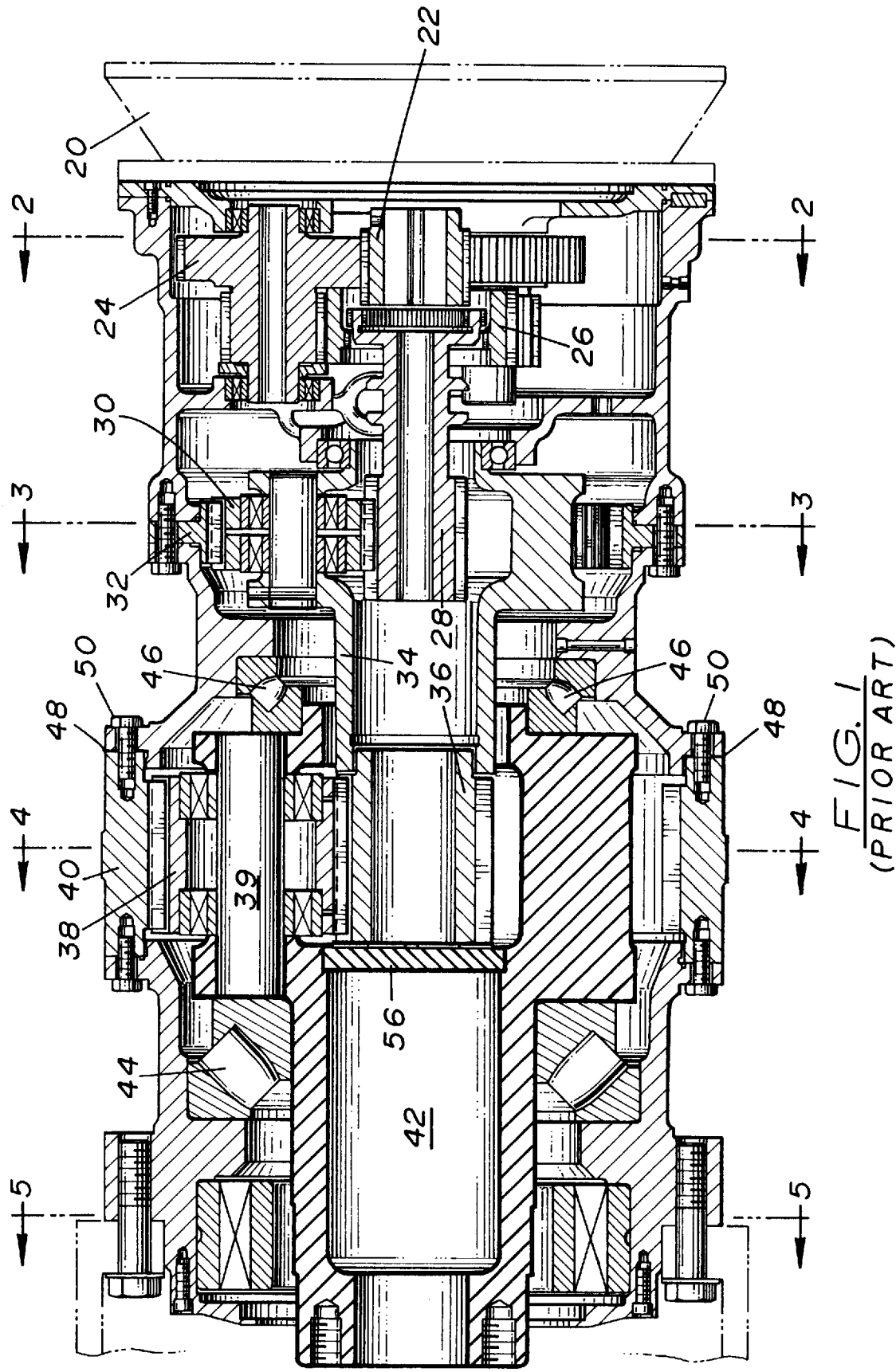
FIG. 1 is a view in axial cross-section of a conventional three-stage planetary gear drive assembly for a raise drill, somewhat schematic in nature, with the one-piece planetary hub and output shaft thereof shown in bolder outline and bolder cross-section for clarity.
Figures 2, 3, 4, 5:
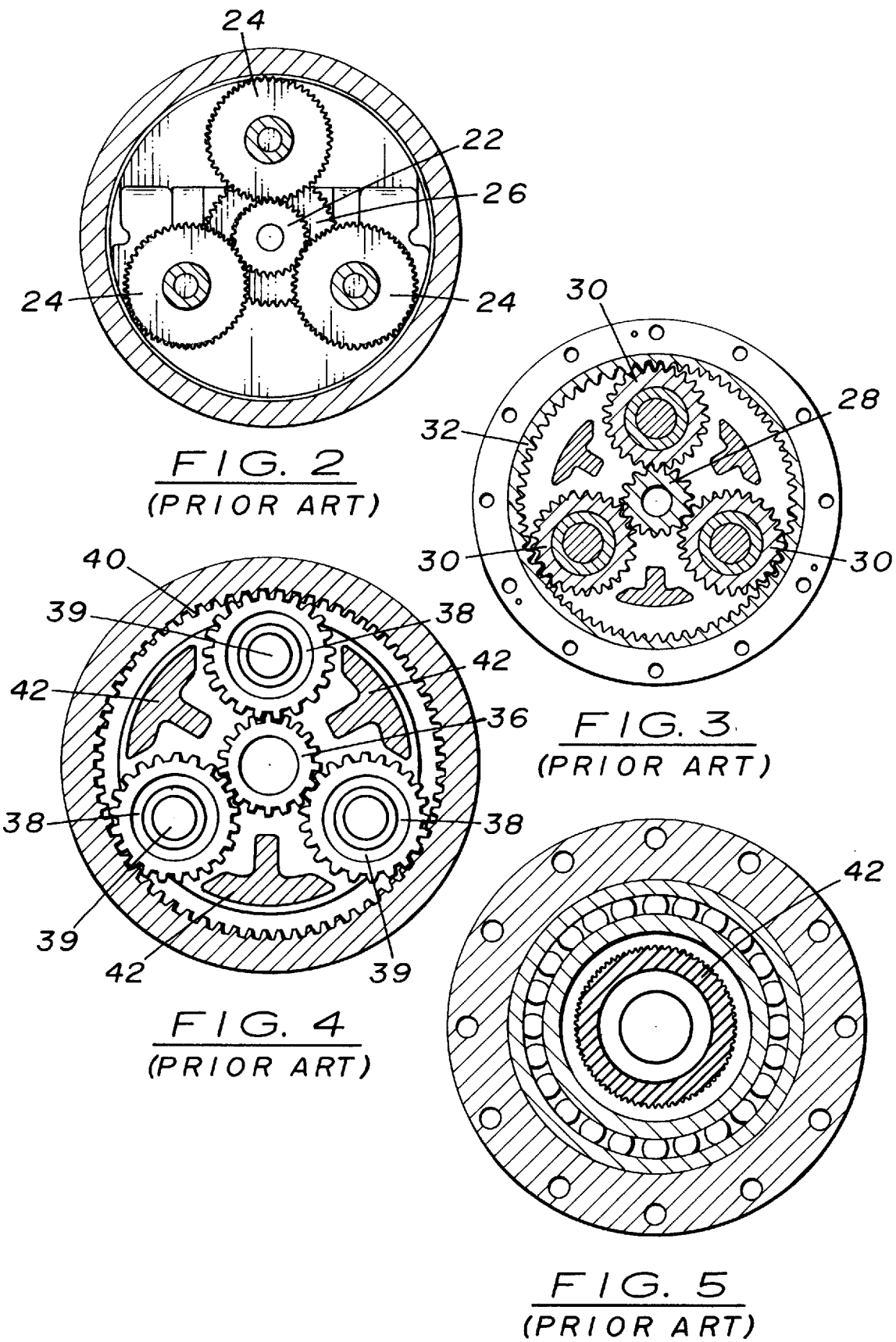
FIG. 2 is a cross-sectional view of the mechanism shown in FIG. 1, taken substantially along line 2—2 thereof.
FIG. 3 is a cross-sectional view of the mechanism shown in FIG. 1, taken substantially along line 3—3 thereof.
FIG. 4 is a cross-sectional view of the mechanism shown in FIG. 1, taken substantially along line 4—4 thereof.
FIG. 5 is a view of the mechanism shown in FIG. 1, taken subsantially along line 5—5 thereof.

For background purposes and to provide a good understanding of the invention, FIGS. 1–5 present various cross-sectional views of a conventional raise drill planetary gear-type drive assembly including a one-piece hub and output shaft like that shown at 152 in Poage U.S. Pat. No. 3,454,114 and Hattrup et al. U.S. Pat. No. 3,490,546. For purposes of this disclosure, the components making up the drive train path in this conventional prior art assembly as shown in FIGS. 1–5 need not be described in full detail and in this connection reference can be had to the disclosures of the referenced patents for a more detailed presentation of the components of this assembly. As shown in FIGS. 1–5, the conventional planetary gear drive train assembly for a raise drill such as the Robbins 61R raise drill or Robbins 71R raise drill, comprises a drive train path starting with electric or hydraulic motor 20 and its motor pinion 22 to a first reduction gear 24 to ring gear 26 to first sun gear 28 to planet pinions 30 to ring gear 32 to second reduction planet hub 34 to second sun gear 36 to planet pinion 38 gears on pinion shafts 39 (also known as planet pins) to ring gear 40 then to third reduction planet hub and output shaft 42, the cross-sectional form of which is shown in heavier lines for illustration and ease of recognition. Of significance in connection with analyzing the third reduction planet gearing and hub and output shaft 42 are main thrust bearings 44 and upper thrust bearings 46 which are designed to include preload by means of the shim stack 48 and associated bolts 50 engaging the ring gear 40 and by means of the shim stack 52 and associated bolts 54 engaging the ring gear 32. Thrust plate 56 supports sun gear 36 and is in turn supported by the hub and output shaft 42.

According to the present invention, and as shown by FIGS. 6–10, the hub and output shaft of the raise drill drive assembly shown in FIGS. 1–5, rather than being in one piece as shown at 42, is made in two major pieces, an output shaft 100 (FIGS. 6 and 7) and a hub 120 (FIGS. 8 and 9).

Output shaft 100 comprises at its upper end an annular ring portion 102 with three peripheral recesses 104 and an internal annular recess 106. At its lower end, output shaft 100 is provided with either a series of bolt-receiving threaded holes 108 for bolting of the output shaft to a drive head, such as shown in U.S. Pat. No. 3,454,114, at anchoring bolts 62. Alternatively, the lower end of output shaft 100 can be provided with interior threads 110 for engagement with an externally threaded upper end portion of a drive head assembly such as shown in U.S. Pat. No. 5,370,194 at externally threaded upper end portion 68 of upper drive head portion 46.

Figure 10:
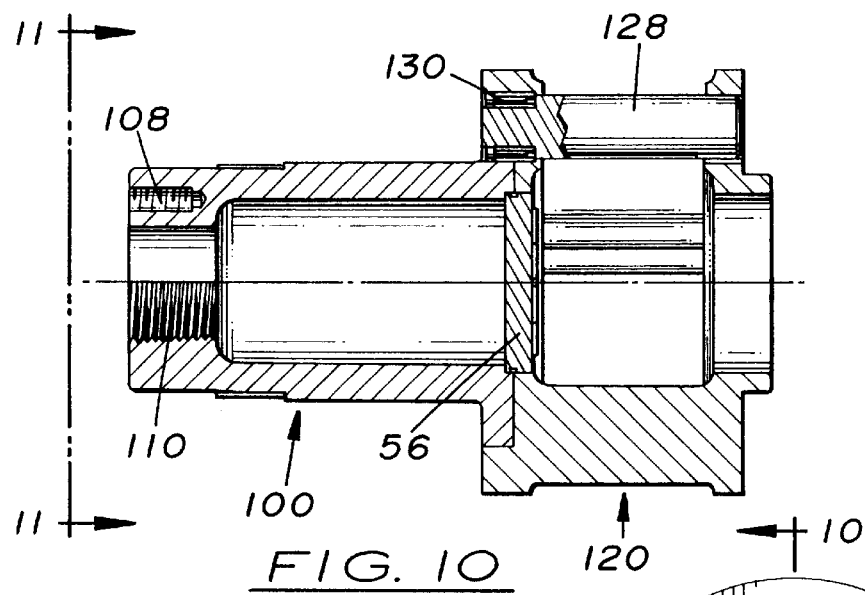
FIG. 10 is an axial cross-sectional view of the assembled, two-piece hub of FIGS. 8 and 9 and the output shaft of FIGS. 7 and 8, taken substantially along line 10—10 of FIG. 11.
Figure 11:
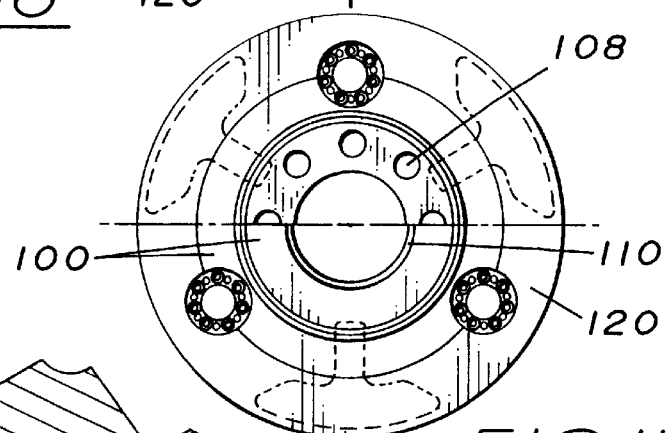
FIG. 11 is an end elevational view of the hub and output shaft shown in FIG. 10, taken substantially along line 11—11 thereof.

Planetary hub, as shown in FIGS. 8 and 9, comprises a lower cylindrical recess of a dimension to interfit over the annular ring portion 102 of the output shaft 100. Also, the hub 120 comprises three pairs of upper and lower, axially aligned holes 124, 126 in which pinion gear shafts 128 are placed, as shown in the views of FIGS. 10 and 11 showing the output shaft 100 and hub 120 in assembled relationship. Pinion gear shafts 128 as shown comprise taper lock bushing assemblies 130 which expand when the parts are in assembled position which rigidly interengage and lock the output shaft 100 to the hub 120 with each bushing 130 engaging both a lower hole 126 in the hub and a recess 104 in the output shaft 100.

The remaining component shown in the assembled view of FIG. 10 is the conventional thrust plate 56.

Figure 12:
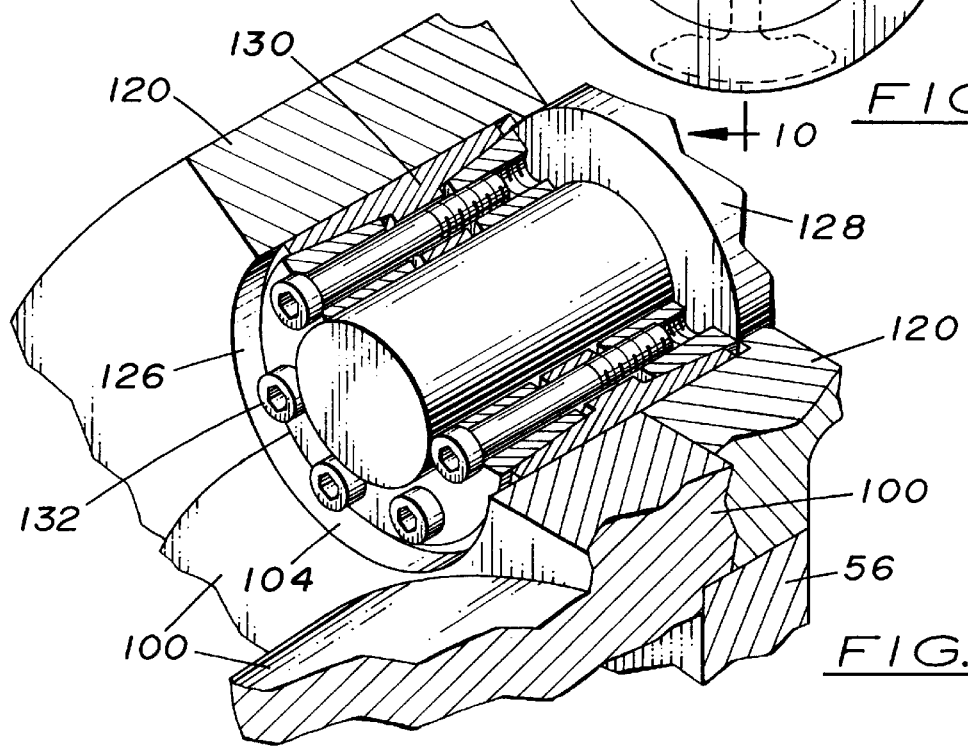
FIG. 12 is an enlarged detail view, partly in cross-section, showing portions of the hub and shaft as interconnected by a taper lock bushing on a pinion gear shaft.

Utilizing a planetary hub and a separate output shaft according to the invention makes the third reduction planetary hub and output shaft considerably less costly and easier to machine. It also provides for separation of the loading in the sense that the lower output shaft takes the tension load and the upper hub base takes the torque load. Transfer of torque between the hub 120 and shaft 100 is through the planet gear shafts 128. As indicated, the two parts (hub and shaft) are suitably held together nominally by so-called taper lock bushing assemblies, or similar devices, with one being used with each planet gear shaft. When the gearing is assembled with the other drive components, the hub and shaft are also held together by the preload on the thrust bearings 44 and 46. The taper lock bushings 130, also known as internal shrink discs, are suitably conventional per se, such as are available from the B-LOC Corp. of Monroe, N.Y., and are comprised of sloped frusto-conical components of enlarging diameter as the components are drawn together with cap screws 132 to lock each of the three planet gear shafts 128 to both major parts 100 and 120 (note the enlarged detail in FIG. 12).

Another major reason for the two-piece design is that the strength of the output shaft can be significantly improved by virtue of the fact that it can be made from a stronger piece of steel and can be more readily heat hardened than can the overly large one-piece unit. The hub portion similarly does not require the high strength of the output shaft and can be made from a steel of lesser strength.

It is also an advantageous characteristic of the two-piece planetary third reduction hub and output shaft of the present invention that it is readily adaptable to be incorporated in modifications of existing one-piece hub/shaft designs. One chronic problem in connection with heavy duty usage of large diameter raise drills is an inherent weakness in the conventional one-piece design in that the drill string is simply bolted onto the lower end of the output shaft drive head assembly. Such bolting can and often does fail. There is a strong need for an improved output shaft and drive head assembly interconnection on many existing raise drills of earlier design. Such an improved drive head assembly is shown in prior U.S. Pat. No. 5,370,194 wherein the drive head assembly is arranged on the output shaft of the raise drill drive train by means of large interior threads in the output shaft which are engaged by an externally threaded upper end portion of the drive head assembly (noting internally threaded output shaft 32 and externally threaded upper portion 68 of hollow bolt 70 in the output shaft and drive head arrangement of the drive train shown in U.S. Pat. No. 5,370,194). By utilization of the present invention, a one-piece hub and output shaft such as shown in FIG. 1, can be modified by cutting off the output shaft portion of the one-piece hub and shaft and utilizing the remaining hub as the hub portion of a two-piece hub and shaft assembly according to the invention, with a new output shaft component modified to be internally threaded much in the manner of the lower end of the output shaft shown in said U.S. Pat. No. 5,370,194. In short, one major reason for the two-piece design offered by the present invention and one important advantage thereof is that the output shaft (suitably modified to be a separate component) can be interiorly threaded at its lower end and an improved type of drive head assembly such as shown in U.S. Pat. No. 5,370,194 can be installed thereon.

While the present disclosure and drawings show connection between the planetary hub and output shaft by planet shaft or pins including taper lock bushings, it will be understood that other interconnection components can be used to join the hub and shaft in a manner effectively transmitting torque from the hub to the output shaft.

From the foregoing, various further modifications, variations and adaptations of the invention will occur to those skilled in the art to which the invention is addressed, within the scope of the following claims.

I claim:

1. A two-piece planetary hub and output shaft combination for use in a planetary reduction gear drive assembly having a drive train path including first, second and third reduction gearing driving the planetary hub and output shaft, the planetary hub and output shaft being separately formed and rigidly interconnected by a plurality of planet gear shafts each engaging a hole in the hub and a recess in the output shaft.

2. A two-piece planetary hub and output shaft combination for use in a planetary reduction gear drive assembly having a drive train path including first, second and third reduction gearing driving the planetary hub and output shaft, the planetary hub and output shaft being separately formed and rigidly interconnected by three planet gear shafts each engaging a hole in the planetary hub and a recess in the output shaft, such interconnection being by taper lock bushing assemblies locking the planet gear shafts to both the planetary hub and the output shaft.

3. In a planetary reduction gear drive assembly having an input reduction stage, at least one intermediate reduction stage, and a final reduction stage, an improved final reduction stage comprising:

a hub having an axis and a periphery, and defining an axially concentric cylindrical recess at one end and a plurality of peripherally located, axially aligned hole pairs for receiving a plurality of pinion gear shafts; and an output shaft having an axis and a concentric annular ring portion at one end sized to fit within the cylindrical recess of the hub, the ring portion defining a plurality of recesses corresponding in number and location to the plurality of hub hole pairs whereby the hub is rotationally engaged with the output shaft when the plurality of pinion gear shafts are located in the plurality of hole pairs.

4. The final reduction stage of claim 3 further comprising at least one taper lock bushing assembly for each hole pair to removably lock the pinion gear shaft to both the hub and the output shaft.

5. The final reduction stage of claim 3 wherein three hole pairs are defined by the hub.

6. The final reduction stage of claim 5 further comprising three taper lock bushing assemblies to removably lock the pinion gear shaft to both the hub and the output shaft.

7. The final reduction stage of claim 6 wherein the output shaft is a hollow cylinder.

8. A planetary gear reduction assembly comprising:

a ring gear having an axis;

a hub having an axis, a periphery, and defining an axially concentric cylindrical recess at one end and a plurality of peripherally located, axially aligned hole pairs for receiving a plurality of pinion gear shafts, the hub being coaxially disposed in the ring gear;

an output shaft having an axis and a concentric annular ring portion at one end sized to fit within the cylindrical recess of the hub, the ring portion defining a plurality of recesses corresponding in number and location to the plurality of hub hole pairs; and a plurality of pinion gears having pinion gear shafts whereby the hub is rotationally engaged with the output shaft when the plurality of pinion gear shafts are located in the plurality of hole pairs.

9. The planetary gear reduction assembly of claim 8 further comprising at least one taper lock bushing assembly for each pinion gear shaft to removably lock the pinion gear shaft to both the hub and the output shaft.

10. The planetary gear reduction assembly of claim 8 wherein three hole pairs are defined by the hub.

11. The planetary gear reduction assembly of claim 10 further comprising three taper lock bushing assemblies to removably lock the pinion gear shaft to both the hub and the output shaft.

12. The planetary gear reduction assembly of claim 11 wherein the output shaft is a hollow cylinder.

\* \* \* \* \*